US012352198B2

(12) United States Patent
Riddle, II et al.

(10) Patent No.: US 12,352,198 B2
(45) Date of Patent: Jul. 8, 2025

(54) EXHAUST AFTERTREATMENT APPARATUS

(71) Applicant: Purem Novi, Inc., Novi, MI (US)

(72) Inventors: Jack Riddle, II, Brighton, MI (US); Hyde Kani, Northville, MI (US)

(73) Assignee: PUREM NOVI, INC., Novi, MI (US)

( * ) Notice: Subject to any disclaimer, the term of this patent is extended or adjusted under 35 U.S.C. 154(b) by 0 days.

(21) Appl. No.: 18/687,625

(22) PCT Filed: Aug. 31, 2022

(86) PCT No.: PCT/US2022/042199
§ 371 (c)(1),
(2) Date: Feb. 28, 2024

(87) PCT Pub. No.: WO2023/034412
PCT Pub. Date: Mar. 9, 2023

(65) Prior Publication Data
US 2024/0360779 A1    Oct. 31, 2024

Related U.S. Application Data

(60) Provisional application No. 63/239,049, filed on Aug. 31, 2021.

(51) Int. Cl.
*F01N 3/20* (2006.01)
*F01N 3/28* (2006.01)

(52) U.S. Cl.
CPC .............. *F01N 3/208* (2013.01); *F01N 3/28* (2013.01)

(58) Field of Classification Search
CPC ........ F01N 3/208; F01N 3/28; F01N 2240/20; F01N 2610/02; F01N 2470/24; F01N 2470/08

(Continued)

(56) References Cited

U.S. PATENT DOCUMENTS 7,614,215 B2    11/2009    Warner et al.
8,336,301 B2    12/2012    Werni et al.
(Continued)

FOREIGN PATENT DOCUMENTS

CN    103477041 A1    12/2013
DE    102009036511 A1    10/2010
(Continued)

OTHER PUBLICATIONS

International Search Report and Written Opinion dated Dec. 13, 2022, Application No. PCT/US2022/042199.
(Continued)

*Primary Examiner* — Kenneth J Hansen
*Assistant Examiner* — Kelsey L Stanek
(74) *Attorney, Agent, or Firm* — The Dobrusin Law Firm, P.C.; Daniela M. Thompson-Walters

(57) ABSTRACT

The teachings may find particular use in providing thermal enhancement, such as with hydrocarbon, to a catalyst for regeneration and particulate burn-off of a filter. The teachings relate to an exhaust aftertreatment apparatus including: a) a reactor portion, b) a mixer located within the reactor portion, including: i) an outer tube; ii) an inner tube located within the outer tube; iii) an outer passage formed between a wall of the reactor portion and the outer tube; iv) an intermediate passage formed between the outer tube and the inner tube; and iv) an inner passage formed within the inner tube; and c) an injector in fluid communication with the reactor portion and upstream from the mixer, wherein the injector is configured to spray a reactant into the reactor portion such that it mixes with the exhaust stream in the mixer.

21 Claims, 3 Drawing Sheets

(58) Field of Classification Search
USPC .......................................................... 60/295
See application file for complete search history.

(56) References Cited

U.S. PATENT DOCUMENTS

| | | | |
|---|---|---|---|
| 8,763,375 B2 | 7/2014 | Wieland et al. | |
| 8,899,026 B2 | 12/2014 | Loman et al. | |
| 9,074,522 B2 | 7/2015 | Scholt et al. | |
| 9,103,258 B2 | 8/2015 | Norling et al. | |
| 9,188,039 B2 | 11/2015 | Nagel et al. | |
| 9,194,267 B2 | 11/2015 | Loman | |
| 9,334,785 B2 | 5/2016 | Marquardt-Stammberger et al. | |
| 10,428,711 B2 | 10/2019 | Zhang | |
| 2006/0008397 A1* | 1/2006 | Bruck | F01N 13/14 422/177 |
| 2010/0139258 A1* | 6/2010 | Hackett | B01F 25/431 60/299 |
| 2010/0199645 A1* | 8/2010 | Telford | F01N 13/009 60/295 |
| 2013/0152557 A1* | 6/2013 | Brugger | F01N 3/106 422/168 |

FOREIGN PATENT DOCUMENTS

| | | |
|---|---|---|
| EP | 3566765 A1 | 11/2019 |
| FR | 2900439 A3 | 11/2007 |
| KR | 101800517 B1 | 11/2017 |
| WO | 2009024815 A2 | 2/2009 |

OTHER PUBLICATIONS

International Preliminary Report on Patentability dated Nov. 13, 2023, Application No. PCT/US2022/042199.

* cited by examiner

EXHAUST AFTERTREATMENT APPARATUS

FIELD

The present teachings relate to an exhaust system. The exhaust system may find particular use as an exhaust aftertreatment system. The exhaust system may find particular with after treatment hydrocarbon injection in diesel combustion systems.

BACKGROUND

Generally, internal combustion engines produce an exhaust stream having toxic gases and pollutants within the exhaust stream. Agencies across the world, such as the United States Environmental Protection Agency, have enacted regulations regarding the exhaust emissions, seeking to reduce the toxic gasses and pollutants. It is now typical that transportation vehicles (e.g., commercial vehicles, such as trucks) are equipped with exhaust aftertreatment systems configured to remove or reduce the toxic gasses and pollutants within the exhaust stream prior to emission of the exhaust stream to the atmosphere. Vehicles having diesel combustion systems are most often equipped with such aftertreatment systems.

In efforts to meet stringent emission requirements, it has become common to perform one or a series of chemical reactions within the exhaust system. It is common to perform selective catalytic reduction ("SCR"). That reaction typically seeks to convert (by a reduction reaction) one or more nitrogen oxides found in an exhaust stream into benign nitrogen gas and water. It is also common to employ a diesel particulate filter ("DPF"). A diesel particulate filter generally removes particulate matter (e.g., diesel particular matter) or soot from the exhaust stream. A diesel particulate filter may undergo filter regeneration. A catalyst may be used in conjunction with a diesel particulate filter to burn off accumulated particulates within the filter, or a fuel burner may be used in conjunction with the filter to actively burn the particulates. Such a catalyst may include a diesel exothermic catalyst ("DEC"), a diesel oxidation catalyst ("DOC"), or both. A diesel exothermic catalyst, diesel oxidation catalyst, or both may be packaged in a single reactor portion along with the diesel particulate filter to provide for the filter regeneration. As a result of the various chemical and filtering reactions, a typical exhaust system is required to effectively function as a chemical reaction system, pursuant to which each of the chemical reactions is performed in a portion ("reactor portion") of the after-treatment system. Separation(s) may be performed within a reactor portion or within a separate portion.

A challenge presented by known exhaust aftertreatment systems is the overall space required to integrate the exhaust system into a transportation vehicle. Typically, in-line exhaust aftertreatment systems will incorporate a series of reactor portions and filter(s) in a generally straight exhaust stream flow path configuration sharing a single, common flow axis along the length of the reactor portions. To achieve such functionality, along with the straight flow path of the exhaust stream, it may necessarily require that the system extend along almost an entire length of a vehicle from a motor to the rear of the vehicle. This can become complex in integrating the exhaust after-treatment system with other vehicle components (e.g., brake lines, fuel tank, fuel lines, suspension system, electrical wiring, etc.) or cargo storage areas (such as the case with heavy duty trucks). In essence, there are two competing interests with inline exhaust aftertreatment systems, sufficient length to allow for reactants to uniformly mix with the exhaust stream and result in the desired chemical reactions and a small enough size to be adaptable to be integrated in varying transportation vehicles and efficiently using space.

As gleaned from the above, reactor portions in exhaust systems typically employ a catalyst which reacts with the exhaust stream passing therethrough. The employment of catalysts tends to be dimensionally dependent (e.g., length, width, height, area and/or volume dependent), as well as possibly being temperature dependent in order that chemical reactants be sufficiently exposed to a catalyst at a desired reaction temperature to achieve the desired reaction. For example, successful filter regeneration and burning off of particulate matter often requires that a stream of a reactant (e.g., hydrocarbon) be injected and mixed with an exhaust stream. Successful and thorough mixing within a short exhaust stream flow path to support filter regeneration has posed technical challenges. Accordingly, achieving the potentially multiple objectives for a successful mixing and/or chemical reactions within a compact packaging space has produced various competing technical challenges.

SUMMARY

The present disclosure relates to an exhaust aftertreatment apparatus comprising: a) a reactor portion which is tubular with an inlet opposing an outlet, and has a flow axis parallel with a longitudinal axis of the reactor portion: b) a mixer located within the reactor portion, the mixer including: i) an outer tube: ii) an inner tube located within the outer tube: iii) an outer passage formed between a wall of the reactor portion and the outer tube: iv) an intermediate passage formed between the outer tube and the inner tube; and v) an inner passage formed within the inner tube: c) an injector in fluid communication with the reactor portion and upstream from the mixer, wherein the injector is configured to spray a reactant into the reactor portion such that it mixes with the exhaust stream in the mixer.

The present disclosure further relates to a method for treating an exhaust stream resulting from internal combustion of a transportation vehicle comprising: a) flowing an exhaust stream through an inlet of a reactor portion such that a direction to the untreated exhaust stream is substantially parallel to a longitudinal axis of the reactor portion: b) introducing a reactant into the exhaust stream within the reactor portion after the inlet: c) diffusing and directing the exhaust stream and the reactant toward away from the longitudinal axis and toward an outlet of the reactor portion: d) flowing the exhaust stream and the reactant toward the outlet; and e) reversing a flow direction of the exhaust stream and the reactant such that the exhaust stream and the reactor flow toward the inlet: f) reversing the flow direction of the exhaust stream and the reactant such that the exhaust stream and the reactor flow toward and through the outlet of the reactor portion; and wherein the reactant mixes with the exhaust stream such that the exhaust stream maintains or has an increased temperature at the outlet as compared to the outlet.

The present disclosure provides for a mixer useful in exhaust aftertreatment devices which can minimize the length needed to provide for mixing of a reactant with an exhaust stream. The mixer may be useful in providing for multiple flow axes within one reactor portion. The mixer may allow for a reactor portion to have a shorter overall length. A mixer may allow for a combined exhaust stream and reactant mixture to flow in opposing directions within a same reactor portion. A mixer may allow for the reactant to be substantially uniformly distributed with the exhaust stream prior to exiting a reactor portion and/or the mixer. The present teachings may be beneficial in providing for a smaller reactor portion by employing a mixer which is configured to change the flow direction of the exhaust stream and mixer one or more times such that the mixing of the two fluids can occur over a shorter length. The present teachings may be advantageous in providing for more uniform distribution of a reactant with an exhaust stream within a reactor portion by providing a mixer within the reactor portion which is configured to change the flow direction of the fluids one or more times within the reactor portion and mixer.

DETAILED DESCRIPTION

Figure 1:
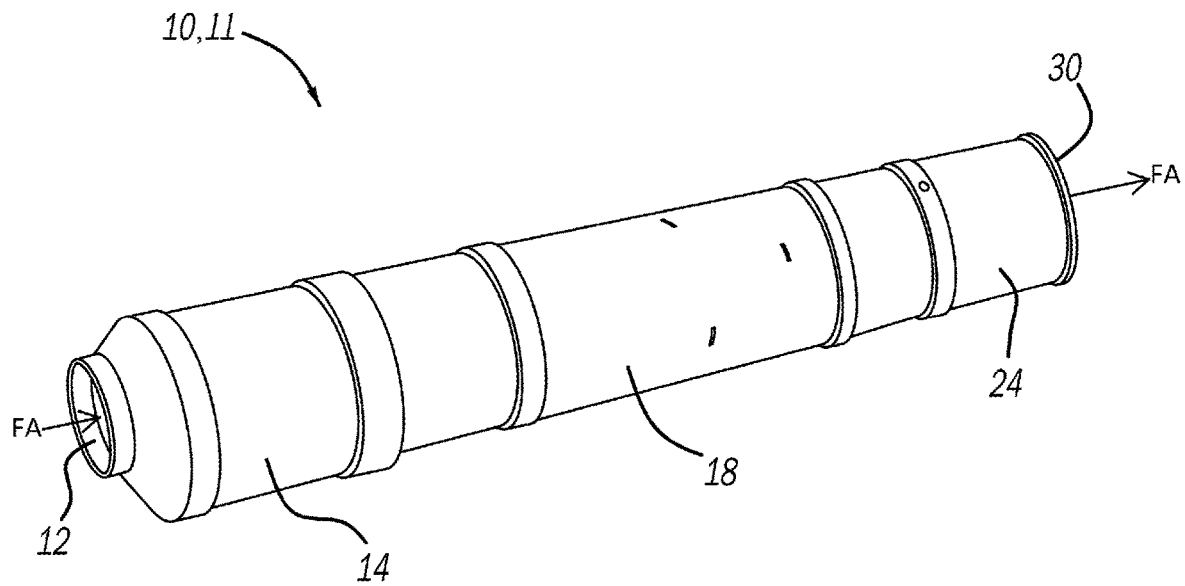
FIG. 1 is a perspective view of an exhaust aftertreatment apparatus.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Unless otherwise stated, or clearly understood from the context of its use, reference herein to "exhaust stream" includes the stream of exhaust fluid initially emitted as a combustion reaction product from an engine, as well as any resulting fluid reaction products occasioned by an aftertreatment step as described herein (e.g., a step of a DOC reaction, an SCR reaction, or other reaction, such as a thermolytic and/or hydrolytic reaction). The use of "untreated" may refer to the exhaust stream that has not yet been mixed with and/or reacted with a reactant. The use of "treated" or "mixed" may refer to the exhaust stream that has be mixed with and/or reacted with a reactant.

The teachings herein relate to an apparatus. The apparatus may be particularly useful in treating an exhaust stream. The apparatus may be referred to as an exhaust aftertreatment apparatus. The exhaust stream may be an exhaust resulting from internal combustion. The internal combustion may be from any engine, such as that of a transportation vehicle. Transportation vehicle may include any vehicle suitable for land, water, and/or air transportation. Transportation vehicles suitable for land may include any size truck, bus, car, all-terrain vehicle, rail vehicle, agricultural equipment, construction equipment, etc. Trucks may include light duty, medium duty, heavy duty, vocational trucks, etc. The presented teachings may also be used in non-vehicular applications. For example, the teachings herein may be applied to stationary generators, pump stations, industrial power generating operations, etc. The internal combustion may be in a diesel engine, gasoline engine, or the like. The apparatus may receive an exhaust stream from a motor. An exhaust line may carry the exhaust stream away from an internal combustion engine and to an inlet of the apparatus. The apparatus may function to reduce particulate matter and pollutants occurring with the exhaust stream, ensure an emitted exhaust stream meets environmental standards, or both. The apparatus may function reacting with the exhaust stream to collect, remove, reduce, and/or convert particulate matter and pollutants. The apparatus may include a plurality of components to allow the apparatus to function as recited. The components may include one or more pipes, tubes, reactor portions, mixers, brackets, diffusers, flow diverters, particle filters, catalysts, injectors, the like, or any combination thereof.

The apparatus includes one or more reactor portions. The reactor portions may function to house one or more mixers, react (or house a reaction) with an exhaust stream, remove particulates from the exhaust stream, house one or more filters, house one or more catalysts, receive one or more reactants, or any combination thereof. The one or more reactor portions may have any suitable size and/or shape for housing a mixer, being in communication with a reactant source, shape for reacting with an exhaust stream passing therethrough, removing particulate matter from the exhaust stream, directing the exhaust stream through the same or another reactor portion and/or apparatus, housing one or more other components, or any combination thereof. The one or more reactor portions may be generally cylindrical, cubed, spherical, coned, prismed, the like, or any combination thereof. One or more reactor portions may be tubular. One or more reactor portions may have generally the same or a differing shape as one or more other reactor portions. One or more reactor portions may have one or more sidewalls (e.g., walls) extending from one end to an opposing end. One or more reactor portions may include one or more inlets, outlets, or both. An inlet may be opposing an outlet. An inlet of one reactor portion may be adjacent an outlet of another reactor portion. One or more reactor portions may have a flow axis. One or more filters, catalysts, and/or mixers may be housed and/or enclosed within the one or more sidewalls. One or more injectors may be affixed to one or more sidewalls.

One or more reactor portions may include one or more upstream reactor portions, intermediate reactor portions, downstream reactor portions, or any combination thereof. Upstream, intermediate, and/or downstream may refer to the location of the reactor portions in relation to one another and the flow of fluid therein (e.g., exhaust stream). An upstream reactor portion may receive an exhaust stream from an inlet, inlet pipe, or both. An upstream reactor portion may receive an exhaust stream and transmit to either one or more intermediate reactor portions, downstream reactor portions, or both. An intermediate reactor portion may receive an exhaust stream from one or more upstream reactor portions, intermediate reactor portions, or both. An intermediate reactor portion may transmit an exhaust stream to one or more other intermediate reactor portions, one or more downstream reactor portions, or both. A downstream reactor portion may receive an exhaust stream from one or more upstream reactor portions, intermediate reactor portions, or both. A downstream reactor portion may guide an exhaust stream toward an outlet, outlet pipe, or both. A mixer may be part of any reactor portion. A mixer may be part of an upstream, downstream, and/or intermediate reactor portion.

One or more reactor portions may have a generally same or differing length and/or width as one or more other reactor portions. Length may be measured along a flow axis, longitudinal axis, or both of a reactor portion. Width may be measured generally transverse to a flow axis and/or longitudinal axis of a reactor portion. One or more reactor portions may have a width which is substantially continuous. One or more reactor portions may have a width which increases, decreases, or both along a length of the reactor portion.

One or more reactor portions may be defined by a first end region and/or first end opposite a second end region and/or second end. A first end region may define an inlet of a reactor portion. A second end region may define an outlet of a reactor portion. Flow of an exhaust stream through a reactor portion may be from a first end region, first end, and/or inlet to a second end region, second end, and/or outlet. One or more reactor portions may be in fluid communication with one or more other reactor portions.

The one or more reactor portions may have a longitudinal axis (e.g., flow axis) extending along their respective length. The longitudinal axis may extend from a first end region of a reactor portion to a second end region of a reactor portion. A first end region may include an end (i.e., first end, inlet) of a reactor portion. A second end region may include an opposing end (i.e., second end, outlet) of a reactor portion. The longitudinal axis may be generally concentric or off-center with a cross-sectional area of a reactor portion. For example, a longitudinal axis may be concentric with a diameter of a reactor portion. The longitudinal axis of one or more reactor portions may be generally parallel with, perpendicular to, or any angle therebetween relative to the longitudinal axis of one or more other reactor portions. Generally, may mean within about 5°, within about 100, or even within about 20° from the values stated. The longitudinal axis of one or more reactor portions may be concentric with, aligned with, un-centered from, off-set from, or any combination thereof relative to one or more other longitudinal axes of one or more other reactor portions. Longitudinal axes which are generally parallel with and off-set from one another may allow for the reactor portions to be consolidated and placed adjacent to one another (e.g., a box-style exhaust system). Longitudinal axes which are generally parallel with and substantially aligned with one another may allow for reactor portions to form an "in-line" exhaust system. A longitudinal axis may define an axis of a Cartesian coordinate system. The longitudinal axis may define an x-axis of each reactor portion. Generally transverse to the x-axis and/or longitudinal axis may be an y-axis and/or a z-axis. The y-axis, z-axis, or both may located at about a mid-length of a reactor portion. The differing axes may be useful in relating one or more components of the apparatus with one another, an exhaust stream passing through the apparatus, dimensions of one or more components, and the like. A longitudinal axis may be referred to as a flow axis (e.g., with reference to flow through a reactor portion of an exhaust stream).

A flow axis may indicate the direction of flow of an exhaust stream relative to a longitudinal axis, along a length of a reactor portion, along one or more passages of a mixer, or any combination thereof. A flow axis may extend from one end region to an opposing second end region. The flow axis of one or more components may flow in a same direction, transverse direction, and/or opposing direction as the flow axis of one or more other portions. One or more reactor portions may have a single flow axis or a plurality of flow axes. A reactor portion housing one or more mixers, diffusers, and/or flow diverters may include a plurality of flow axes which change the direction of flow therein. A plurality of flow axes may include a first flow axis, a second flow axis, a third flow axis, the like, or any combination thereof. The plurality of flow axes may be concentric or off-center with one another.

The apparatus may include one or more flow pipes. The one or more flow pipes may allow the exhaust stream to enter into and/or exit the apparatus, one or more reactor portions, or both. The one or more flow pipes may have any suitable size, shape, and/or configuration to function as described. The one or more pipes may be generally cylindrical, cubed, spherical, coned, prismed, the like, or any combination thereof. The one or more pipes may have a cross-section which is generally circular, elliptical, oval, egg-shaped, square, rectangular, triangular, or a combination thereof. A cross-section of a pipe having one shape may expand into a cross-section having a same and/or differing shape. A cross-section of a pipe may narrow and/or expand along its longitudinal axis. For example, a flow pipe may narrow and then widen across its length. The cross-section may be taken through a plane perpendicular, parallel, or therebetween relative to flow axis of pipe. The one or more pipes may include one or more inlet pipes, outlet pipes, or any combination thereof. One or more flow pipes may be located toward and/or at one or more first and/or second end regions of one or more reactor portions. The one or more flow pipes may extend from a reactor portion. An inlet pipe may be affixed to or integrated with an inlet of a reactor portion. An outlet pipe may be affixed to or integrated with an outlet of a reactor portion. The one or more flow pipes may extend at an angle relative to a flow axis of a reactor portion. A flow pipe may be parallel, perpendicular, or any angle therebetween relative to a flow axis. A flow pipe may be about 0) ° or greater, about 5° or greater, about 10° or greater, about 25° or greater, or even about 45° or greater relative to a flow axis of a reactor portion. A flow pipe may be about 90° or less, about 85° or less, about 75° or less, or even about 60° or less relative to a flow axis of a reactor portion.

The apparatus may include one or more mixers. The one or more mixers may function to mix a reactant with an exhaust stream, provide a general uniform mixture of a reactant with the exhaust stream prior to entering and/or leaving one or more reactor portions, allowing one or more mixers to function as a thermal enhancer, preparing an exhaust stream for a downstream reaction, or any combination thereof. The one or more mixers may function and/or be referred to as one or more hydrocarbon mixers ("HC mixer"). The one or more mixers may have any size, shape, and or configuration to allow for mixing and/or optimizing a reaction of a reactant with the exhaust stream. The one or more mixers may be static, dynamic, or a combination of both. The one or more mixers may reside within, adjacent to, distanced from, or proximate one or more reactor portions. The one or more mixers may reside in a reactor portion: after and/or before a filter and/or catalyst: in-line with, located about, and/or offset with a reactor portion: downstream of a delivery device (e.g., injector): or any combination thereof. The one or more mixers may reside within a same and/or different reactor portion as a reactor portion in which a reactant is introduced. The one or more mixers may be located in a flow path of a reactant, exhaust stream, or both. The one or more mixers (e.g., a longitudinal axis of a mixer) may be concentric, off-center, or both relative to a longitudinal axis, flow axis, or both of a reactor portion. A static mixer may rely on one or more flow paths, blades, and/or openings to create turbulence of the exhaust stream and reactant flowing therethrough. The turbulence may provide for a sufficient amount of intensive mixing to allow for a substantially homogeneous mixture of the reactant and exhaust stream. The one or more mixers may include one or more tubes, passages, diffusers, flow diverters, or any combination thereof. For example, a mixer may include an outer tube, an inner tube, an outer passage, an intermediate passage, and an inner passage. For example, a mixer may include a diffuser and one or more flow diverters.

The one or more mixers may be selected for providing a substantially uniform distribution of one or more reactants. For example, uniformity of distribution of a reactant with the exhaust stream. Uniformity of the reactant may be measured as a percentage, with 100% being perfect uniformity in parts per million values measured at a cross-section transverse to a flow axis. Dispersion may be measured after one or more mixers, within one or more catalysts, or both. One or more mixers may result in uniformity of the reactant with the exhaust stream of about 90% or greater, 92% or greater, 95% or greater, or even about 98% or greater. One or more mixers may result in uniformity of the reactant with the exhaust stream of about 100% or less.

The mixer may include one or more outer tubes. The one or more outer tubes may function to receive an incoming exhaust stream, receive an incoming reactant stream, cooperate with one or more other tubes and/or reactor portions to create one or more passages, support one or more diffusers and/or flow diverters, or any combination thereof. One or more outer tubes may have any size and/or shape to cooperate with one or more other tubes, diverters, diffusers, brackets, reactor portions, fluid delivery devices, the like, or a combination thereof. The one or more outer tubes may have a shape which is partially or substantially a cylinder, cube, prism, pyramid, sphere, cone, ellipsoid, ovoid, the like, or a combination thereof. The one or more outer tubes may have a cross-sectional shape which is partially or substantially circular, rectangular, triangular, ovular, squared, rhombused, oblong (e.g., rounded rectangle), the like, or any combination thereof. A cross-section shape may be the shape substantially perpendicular to a flow within the outer tube. The one or more outer tubes may have a shape at least partially reciprocal with all or a part of one reactor portions, inner tubes, or both. One or more outer tubes may be located within a reactor portion, about another tube (e.g., inner tube), or both. One or more outer tubes may be retained within a reactor portion, about another tube, or both via one or more brackets. For example, an outer tube may be retained in a reactor portion and about an inner tube by one or more brackets. One or more brackets may be one or more ring brackets. One or more outer tubes may be concentric, off-center, or both relative to a longitudinal axis of a reactor portion. One or more outer tubes may have a longitudinal axis which is parallel, perpendicular, or any angle therebetween relative to a longitudinal axis of a reactor portion. One or more outer tubes may be located downstream of a delivery device (e.g., injector). The one or more outer tubes may be located in a same or different reactor portion as a delivery device. The one or more outer tubes may be located downstream and/or upstream of one or more catalysts, filters, or both. The one or more outer tubes may be located in a same or different reactor portion as one or more catalysts, filters, or both. One or more outer tubes may be distanced from one or more walls (e.g., inner walls) of one or more reactor portions, one or more walls (e.g., outer wall) of one or more inner tubes, or both. A distance from one or more walls may form one or more passages. The one or more passages may allow for the flow an exhaust stream, reactant stream, or both therethrough.

One or more outer tubes may have a length. A length of the outer tube may determine a length of one or more passages such as to support mixing of one or more reactants with an exhaust stream. A length of an outer tube may be less than or equal to a length of a reactor portion. Having a length smaller than a reactor portion may allow for one or more other components, such as a delivery device, to be located or affixed to the same reactor portion. Length may be measured relative to a longitudinal axis of an outer tube. An outer tube may have a length which is about 30% or greater, 40% or greater, or even 50% or greater than a length of a reactor portion (e.g., intermediate reactor portion). An outer tube may have a length which is about 75% or less, 65% or less, or even about 55% or less than a length of a reactor portion (e.g., intermediate reactor portion). One or more outer tubes may have a width. The width may be considered a diameter if the outer tube has a circular cross-section. A width of an outer tube may be less than a width of a reactor portion, greater than a width of another tube (e.g., inner tube), or both. A width may allow for one or more passages to be generated between a reactor portion and the outer tube, between the outer tube and the inner tube, or both. An outer tube may have a width which is about 50% or greater, about 60% or greater, about 70% or greater, or even about 75% or greater than a width of a reactor portion (e.g., intermediate reactor portion). An outer tube may have a width which is about 95% or less, about 90% or less, about 85% or less, or even about 80% or less than a width of a reactor portion (e.g., intermediate reactor portion). An outer tube may be located downstream of an inlet of a reactor portion. An outer tube may be distanced from an inlet such as to allow a delivery device to delivery a reactant upstream of the outer tube. An outer tube may be positioned about 5% or greater, about 10% or greater, about 15% or greater, or even about 20% or greater into a length of a reactor portion from an inlet. An outer tube may be positioned about 50% or less, about 40% or less, about 35% or less, or even about 30% or less into a length of a reactor portion.

A mixer may include one or more inner tubes. The one or more inner tubes may function to distribute a reactant with an exhaust stream, guide an exhaust stream toward an outlet, cooperate with one or more outer tubes for creating one or more passages, support one or more flow diverters, or any combination thereof. One or more inner tubes may have any size and/or shape to cooperate with one or more other tubes, diverters, brackets, reactor portions, the like, or a combination thereof. The one or more inner tubes may have a shape which is partially or substantially a cylinder, cube, prism, pyramid, sphere, cone, ellipsoid, ovoid, the like, or a combination thereof. The one or more inner tubes may have a cross-section shape which is partially or substantially circular, rectangular, triangular, ovular, squared, rhombused, oblong (e.g., rounded rectangle), the like, or any combination thereof. A cross-section shape may be a shape substantially perpendicular to a flow within the inner tube. The one or more inner tubes may have a shape at least partially reciprocal with all of part of one or more reactor portions, outer tubes, or both. One or more inner tubes may be located within a reactor portion, within another tube (e.g., outer tube), or both. One or more inner tubes may be retained within a reactor portion, within another tube, or both by one or more brackets, other attachment mechanisms, being integrally attached, the like, or any combination thereof. An inner tube may be affixed directly to or integral with a reactor portion so as to be retained within the reactor portion. An inner tube may be affixed and/or integrally attached to a reactor portion via a flow diverter, diffuser, or both. One or more inner tubes may be concentric, off-center, or both relative to a longitudinal axis of a reactor portion, one or more other tubes (e.g., outer tube), or a combination thereof. One or more inner tubes may have a longitudinal axis which is parallel, perpendicular, or any angle therebetween relative to a longitudinal axis of a reactor portion, other tubes (e.g., outer tube), or both. One or more inner tubes may be located downstream of a delivery device (e.g., injector). The one or more inner tubes may be located in the same or different reactor portion as a delivery device. The one or more inner tubes may be located downstream and/or upstream of one or more catalysts, filters, or both. The one or more inner tubes may be located in a same or different reactor portion as one or more catalysts, filters, or both. One or more inner tubes may be distanced from one or more walls (e.g., inner wall) of one or more outer tubes, reactor portions, or both. A distance from one or more walls may form one or more passages. A hollow interior of one or more interior tubes may form one or more passages. The one or more passages may allow for the flow an exhaust stream, reactant stream, or both therethrough.

One or more inner tubes may have a length. A length of the inner tube may determine a length of one or more passages such as to support mixing of one or more reactants with an exhaust stream. A length of an inner tube may be less than or equal to a length of a reactor portion. A length of an inner tube may be less than, equal to, or greater than a length of a reactor portion. Having a length smaller than a reactor portion may allow for one or more other components, such as a delivery device, to be located or affixed to the same reactor portion. Length may be measured relative to a longitudinal axis of an inner tube. An inner tube may have a length which is about 30% or greater, 40% or greater, or 50% or greater, or even 55% or greater than a length of a reactor portion (e.g., intermediate reactor portion). An inner tube may have a length which is about 80% or less, about 70% or less, about 65% or less, or even about 60% or less than a length of a reactor portion (e.g., intermediate reactor portion). One or more inner tubes may have a width. The width may be considered a diameter if the inner tube has a circular cross-section. A width of an inner tube may be less than a width of a reactor portion, less than a width of another tube (e.g., outer tube), or both. A width may allow for one or more passages to be generated between the inner tube and an outer tube, within the inner tube, or both. An inner tube may have a width which is about 30% or greater, about 40% or greater, about 50% or greater, or even about 55% or greater of a width of a reactor portion (e.g., intermediate reactor portion). An inner tube may have a width which is about 90% or less, about 80% or less, about 70% or less, or even about 65% or less of a width of a reactor portion (e.g., intermediate reactor portion). An inner tube may have a width which is about 50% or greater, about 60% or greater, or even about 70% or greater of a width of an outer tube. An inner tube may have a width which is about 95% or less, about 85% or less, about 80% or less, or even about 75% or less of a width of an outer tube. An inner tube may be located downstream of an inlet of a reactor portion. An inner tube may have a length about less than, equal to, or greater than a length of an outer tube.

An inner tube may be distanced from an inlet such as to allow a delivery device to deliver a reactant upstream of the outer tube. An outer tube may be positioned about 5% or greater, about 10% or greater, about 15% or greater, or even about 20% or greater into a length of a reactor portion from an inlet. An outer tube may be positioned about 50% or less, about 40% or less, about 35% or less, or even about 30% or less into a length of a reactor portion.

A mixer may include one or more passages. The one or more passages may aid in the dispersion of reactant within an exhaust stream. One or more passages may be formed between one or more walls of a reactor portion and mixer, one or more surfaces of one or more inner tubes, or both. One or more passages may be formed between one or more walls of a reactor portion and surfaces of a mixer. One or more passages may be formed in a hollow interior of a reactor portion, mixer, or both. One or more passages may be formed between a wall of a reactor portion and a surface of an outer tube. One or more passages may be formed between a surface of an inner tube and an outer tube. One or more passages may be formed in a hollow interior of a reactor portion, outer tube, inner tube, or any combination thereof. The one or more passages may include one or more outer passages, intermediate passages, inner passages, or a combination thereof. An outer passage may be located upstream of an intermediate passage, inner passage, or both. An intermediate passage may be located downstream of an outer passage, upstream of an inner passage, or both. An inner passage may be located downstream of an outer passage, intermediate passage, or both. The one or more passages may be located parallel with one another, a flow axis, a longitudinal axis, or any combination thereof. One or more inner tubes, outer tubes, or both may be retained in place to form the one or more passages my one or more ring brackets. The flow of an exhaust stream and/or reactant into a passage may be guided via one or more diffusers, flow diverters, or both.

A mixer may include one or more brackets. One or more brackets may function to affix one or more tubes to one or more other tubes, reactor portions, or both. One or more brackets may retain one or more outer tubes to a reactor portion. An outer tube may be retained in a reactor portion by one or more brackets. An outer tube may be retained about an inner tube by one or more brackets. One or more brackets may include any suitable bracket from affixing, distancing, or both one or more tubes from one or more other tubes, reactor portions, or both. One or more brackets may aid in creating one or more passages by distancing one or more tubes from one or more other tubes, reactor portions, or both. One or more brackets may include one or more ring brackets. L-brackets, clamps, spacers, the like, or any combination thereof. One or more brackets may include one or more inner brackets, outer brackets, or both. One or more inner brackets may affix an inner tube to an outer tube. One or more outer brackets may affix an outer tube to a reactor portion. One or more inner brackets may be located about an exterior of an inner tube. One or more inner brackets may be located within an interior of an outer tube. One or more outer brackets may be located about an exterior of an outer tube. One or more outer brackets may be located about an interior of a reactor portion.

One or more brackets may include one or more spacers. One or more spacers may function to distance one or more tubes from one or more other tubes, reactor portions, or both.

One or more spacers may be configured to distance an outer tube from an inner tube such as to form an intermediate passage. One or more spacers may be configured to distance an outer tube from a reactor portion to form an outer passage.

A mixer may include one or more diffusers. The one or more diffusers may function to guide an exhaust stream, reactant, or both into one or more passages: disperse one or more reactants into an exhaust stream: or a combination thereof. The one or more diffusers may be located within a reactor portion, part of a mixer, or both. The one or more diffusers may be located downstream, upstream, and/or part of a fluid delivery device, tubes of a mixer, or both. For example, a diffuser may be located downstream of the injector. For example, a diffuser may be located upstream of an outer tube, inner tube, or both. The one or more diffusers may be part of one or more outer tubes, inner tubes, or both. The one or more diffusers may be part of and/or affixed to an outer tube. The one or more diffusers may be located between the fluid delivery device and the mixer, between an incoming end of a reactor portion (e.g., intermediate reactor portion) and a mixer, or both. The one or more diffusers may have any size and/or shape suitable for guiding and/or dispersing an exhaust stream, one or more reactants, or both. The one or more diffusers may have a shape which expands in width, diameter, cross-sectional area, or a combination thereof. The shape may expand in the direction of flow of the exhaust stream, reactant, or both. The shape may be at least partially conical. The shape may be substantially similar to a truncated cone (e.g., flat cone). The diffuser of the wall may share a wall and/or surface with an outer tube. The diffuser may be affixed (e.g., attached) and/or integral with an outer tube. For example, the diffuser may be integral with the outer tube. The diffuser may expand from the smaller width to a larger width. The larger width may be the same width as that of the outer tube. The outer surface (e.g., exterior) of the diffuser may guide and/or disperse the exhaust stream, reactant, or both toward an outer passage of the mixer. For example, the diffuser may expand toward an outer passage so as to direct an exhaust stream and reactant toward an outer passage. The exhaust stream and reactant may flow away from an inlet toward an outlet which flowing through the outer passage.

A mixer may include one or more flow diverters. A flow diverter may function to guide flow of an exhaust stream, reactant, or both toward one or more passages, an outlet, or both: promote mixing of an exhaust stream with a reactant: or a combination thereof. A flow diverter may function to generate a reverse flow; forward flow, or both. A reverse flow may be a flow going generally opposite a flow axis of a reactor portion and/or mixer. A forward flow may be a flow going in the same direction as a flow axis of reactor portion and/or mixer. A flow diverter may have any shape and/or configuration to guide an exhaust stream, reactant, or both. A flow diverter may be affixed to and/or integral with a mixer. A flow diverter may be located between tubes of a mixer, an inlet of a reactor portion, an outlet of a reactor portion, or a combination thereof. A flow diverter may be located between an inner tube (i.e., of a mixer) and an outlet of a reactor portion. A flow diverter may be affixed to and/or integral with one or more outer tubes, inner tubes, or both. A flow diverter may refer to one or more portions and/or surfaces of one or more diffusers. A flow diverter may be formed in an inner facing surface of a diffuser. An inner facing surface of a diffuser may guide flow of an exhaust stream, reactant, or both. An inner facing surface of the diffuser may guide flow from an intermediate passage to an inner passage. A flow diverter may extend from one or more inner tubes to one or more reactor portions. A flow diverter may extend from an end of an inner tube to an end (e.g., flange) of a reactor portion. For example, a flow diverter may extend from a flange of a reactor portion at an outlet toward an inner tube. A flow diverter may be affixed to and/or integral with an inner tube and/or a reactor portion. A flow diverter may angle away from the inner tube and toward the reactor portion. A flow diverter may extend from a wall of the reactor portion at an outlet toward an inner tube. A flow diverter may be angled away from a wall of a reactor portion, toward an inner tube, toward a longitudinal axis of a reactor portion, toward an interior of a reactor portion, or any combination thereof. A flow diverter may be configured to direct an exhaust stream, reactant, or both from an outer passage toward an intermediate passage. A surface of a flow diverter may guide an exhaust stream, reactant, or both from an outer passage to an intermediate passage. An exhaust stream may flow away from an outlet of a reactor portion (e.g., intermediate reactor portion, reactor portion with a mixer). An exhaust stream may flow toward an inlet of a reactor portion (e.g., intermediate portion, reactor portion with a mixer).

A flow diverter may include one or more flow diverters. A flow diverter may include an intermediate flow diverter. A flow diverter may include an inner flow diverter. An intermediate flow diverter may be located opposite an inner flow diverter. An inner flow diverter may be located between an inlet and an inner tube, outer tube, or both. An inner flow diverter may be configured to direct the exhaust stream, reactant, or both from one passage to another passage. An inner flow diverter may be configured to direct the exhaust stream, reactant, or both from an intermediate passage to an inner passage.

One or more flow diverters may share and/or have a common surface with one or more diffusers. An inner flow diverter may be formed as a surface of a diffuser. The surface may face toward the desired direction of the flow path. The surface may face toward the inlet and/or outlet. The surface may face toward the outlet.

The apparatus may include one or more fluid delivery devices (e.g., valve, injector). The one or more fluid delivery devices may inject and/or control passage of a reactant into the apparatus, one or more reactor portions, one or more mixers, or a combination thereof: into contact with the exhaust stream: control flow of a reactant toward a reactor portion and/or mixer: or any combination thereof. The one or more fluid delivery devices may be any suitable device for releasing and controlling passing of a reactant into the apparatus. The one or more fluid delivery devices may be controlled by one or more controllers of a vehicle, exhaust system, or both. The controllers may determine a timing, amount, and the like of dosing. The one or more fluid delivery devices may include a single jet and/or nozzle or a plurality of jets and/or nozzles for releasing a reactant. The one or more fluid delivery devices may include 1 or more, 2 or more, or even 3 or more jets and/or spray nozzles. The one or more fluid delivery devices may include 10 or less, 8 or less, or even 6 or less jets and/or spray nozzles. The one or more fluid delivery devices may release a reactant having a droplet size. The droplet size may range be about 5 microns or greater, about 10 microns or greater, or even about 30 microns or greater. The droplet size may be about 180 microns or less, about 150 microns or less, or even about 50 microns or less. For example, droplet size may range from about 5 microns to about 50 microns. A smaller droplet size may allow for more efficient and homogeneous mixing of the reactant with the exhaust stream. The one or more fluid delivery devices may be in fluid communication with one or more reactor portions. The one or more fluid delivery devices may be located in and/or on the apparatus, upstream of a mixer, affixed to a reactor portion (e.g., upstream reactor portion, intermediate reactor portion), or a combination thereof. The one or more fluid delivery devices may be connected to and/or in fluid communication with one or more reactor portions. The one or more fluid delivery devices may be located upstream and/or downstream of a filter, catalyst, or both. The one or more fluid delivery devices may be located upstream of one or more diffusers, flow diverters, or a combination thereof. The one or more fluid delivery devices may inject a reactant into the apparatus such that the reactant flows generally perpendicular to, parallel with, or any angle therebetween relative to a flow axis of a reactor portion, mixer, the direction of flow of the exhaust stream within a reactor portion and/or mixer, or a combination thereof. For example, an injector may be configured to spray a reactant into a reactor portion such that the reactant mixes with an exhaust stream, such as in a mixer. The one or more fluid delivery devices may include a hydrocarbon doser, urea doser, or both. A hydrocarbon doser may inject hydrocarbon into a reactor portion. A hydrocarbon doser may inject the hydrocarbon as-needed when regeneration of a filter is necessary. A urea doser may inject urea into a reactor portion. A urea doser may inject urea on a regular basis.

One or more reactants may be introduced into the exhaust stream. One or more reactants may be particularly useful in aiding one or more subsequent reactions for filter regeneration, burning off particulate matter, or both. The one or more reactants may be introduced upstream of a catalyst, filter, mixer, or combination thereof. One or more reactants may be introduced by one or more fluid delivery devices (e.g., injectors). The one or more reactants may include any reactant capable of interacting (e.g., being exposed to) with one or more catalysts to maintain and or raise the temperature of the exhaust stream, maintain the catalyst in an active state, create a burn off reaction, aiding in filter regeneration, burning off particulate matter within the filter, the like, or any combination thereof. For example, the reactant may be configured to maintain or increase the temperature of the exhaust stream while the exhaust stream flows through the reactor portion. The one or more reactor portions may be located prior to a filter regeneration portion of the exhaust aftertreatment apparatus. The one or more reactants may be referred to as a thermal enhancer. The thermal enhancer may maintain or increase a temperature of a catalyst such that the catalyst is maintained or placed in an active state. For example, a reactor portion (e.g., intermediate) may be a thermal enhancer configured to maintain or increase the temperature of the exhaust stream passing therethrough prior to transmitting the exhaust stream to the downstream reactor portion. The reactant may react with a catalyst to combust and increase temperatures of a filter. The one or more reactants may include hydrocarbon. The reactant may be injected and mixed with an exhaust stream. The reactant may maintain and/or increase the overall temperature of the exhaust stream. The reactant may mix with the exhaust stream through a mixer, one or more passages, or both. The reactant may cause a chemical reaction upon contacting a catalyst, filter, or both. For example, a hydrocarbon may react with a diesel exothermic catalyst ("DEC"), a diesel oxidation catalyst ("DOC"), or both and burn off particulate matter within a subsequent particular filter (e.g., a diesel particulate filter "DPF"). As an alternative or in addition to, the one or more reactants may include an ammonia-based substance, such as an aqueous urea solution. Heat occurring in the apparatus may result in evaporation of water from the solution, resulting in urea. Heat may decompose the urea into one or more compounds. Upon decomposition, the urea may decompose into isocyanic acid and ammonia. The ammonia may be particularly useful in conjunction with a selective catalytic reactor. The one or more reactants may be introduced within a reactor portion, a mixer, or any other component in fluid communication with the exhaust stream upstream of reducing nitrogen oxides from the exhaust stream.

The one or more reactor portions may include one or more filters. The one or more filters may function to collect and/or remove particulate matter from an exhaust stream, break apart larger sizes of particulate matter into smaller particles, carry one or more catalysts, or any combination thereof. Particulate matter may include soot residing within an exhaust stream of an internal combustion engine (e.g., diesel engine). The one or more filters may collect particulate matter on one or more surfaces of the filter (e.g., surfaces created by pores). Accumulated particulate matter may be removed through active, passive, and/or forced regeneration. The one or more filters may burn off accumulated particulate matter. Burning off of particulate matter may occur through a catalyst or a burner. Exemplary filters can be found in U.S. Pat. Nos. 8,336,301, 8,763,375, 9,074,522, 9,188,039, and 9,334,785, which are incorporated herein by reference for all purposes. Suitable filters may include cordierite wall flow filters, silicon carbide wall flow filters, ceramic fiber filters, metal fiber flow-through filters, partial filters, the like, or any combination thereof. Suitable filters may include one or more diesel and/or petrol filters. An exemplary filter may include a diesel particulate filter ("DPF"). The one or more filters may be located in, adjacent to, proximate with, and/or in fluid communication with one or more reactor portions. A filter may be located within a reactor portion, upstream and/or downstream of a mixer, upstream and/or downstream of a reactant, or a combination thereof. The one or more filters may carry a catalyst (e.g., coated with a catalyst) or be free of a catalyst. The one or more filters may be located adjacent to or distanced from a catalyst. The catalyst may allow a filter to also react with the exhaust stream in addition to removing particulate matter. For example, a filter may be adjacent to a diesel exothermic catalyst ("DEC") and/or diesel oxidation catalyst ("DOC") which has a chemical reaction with a reactant to result in filter regeneration and burning off of accumulated particulate matter.

The one or more reactor portions may include or be in communication with one or more catalysts. The one or more catalysts may be configured to initiate and/or perform one or more reactions. The one or more reactor portions may function to reduce toxic gasses, toxic pollutants, greenhouse gases, increase temperatures of an exhaust stream, initiate filter regeneration, or a combination thereof. Greenhouse gases may include carbon dioxide, methane, nitrous oxide, fluorinated gases, or any combination thereof. A filter regeneration portion may include a catalyst and a particulate filter. The one or more reactions may function to oxidize hydrocarbon, oxidize carbon monoxide, reduce hydrogen compounds, reduce nitrogen oxides, reduce sulfur oxides, oxidize methane, or any combination thereof. Exemplary catalysts may include a diesel oxidation catalyst (DOC), methane oxidation catalyst (MOC), selective catalytic reactor (SCR), ammonia slip catalyst (ACR), diesel exothermic catalyst (DEC), the like, or any combination thereof. The one or more catalysts may be located in one or more reactor portions. The one or more catalysts may be located within the same and/or a different reactor portion as one or more other catalysts and filters. One or more filters may function as a carrier and/or support structure for a catalyst. A plurality of catalysts may be placed in any sequence within the apparatus. As an example, selective catalytic reactor (SCR) may be located upstream of a diesel exothermic catalyst (DEC) and/or diesel oxidation catalyst ("DOC"). As an example, an upstream reactor portion may be configured to perform selective catalytic reduction. For an example, a downstream reactor portion may be configured to perform filter regeneration of a particulate filter located therein.

Illustrative Examples

FIG. 1 illustrates an apparatus 10. The apparatus 10 is an exhaust aftertreatment apparatus 11. The apparatus 10 is formed as an "in-line" exhaust system. The apparatus 10 includes an inlet pipe 12 opposing an outlet pipe 30. The inlet pipe 12 is in fluid communication with an upstream reactor portion 14. The upstream reactor portion 14 is in fluid communication with an intermediate reactor portion 18. The intermediate reactor portion 18 is in fluid communication with a downstream reactor portion 24. The downstream reactor portion 24 is in fluid communication with the outlet pipe 30. The reactor portions 14, 18, and 24 each have a flow axis FA passing therethrough.

Figure 2:
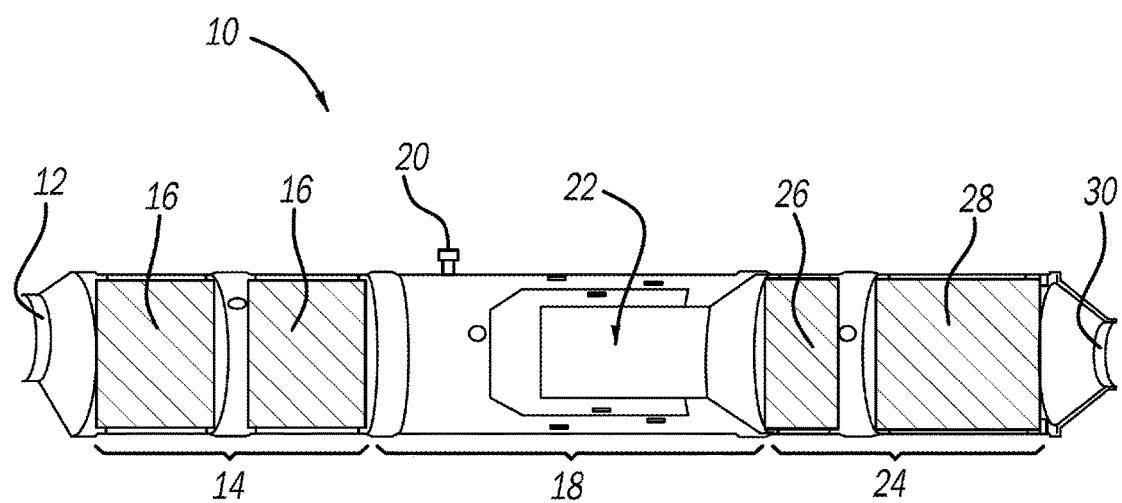
FIG. 2 illustrates a cross-section of an exhaust aftertreatment apparatus.

FIG. 2 illustrates an apparatus 10. The apparatus 10 is formed as an "in-line" exhaust system. The apparatus 10 includes an inlet pipe 12. The inlet pipe 12 is in line and in fluid communication with an upstream reactor portion 14. The upstream reactor portion 14 includes one or more selective catalytic reductants ("SCR") 16. The upstream reactor portion 14 is inline and in fluid communication with an intermediate reactor portion 18. The intermediate reactor portion 18 includes an injector 20 and a mixer 22. The mixer 22 resides within the intermediate reactor portion 18. The intermediate reactor portion is in line and in fluid communication with a downstream reactor portion 24. The downstream reactor portion 24 includes a diesel oxidation catalyst ("DOC") 26 and particulate filter 28. The particulate filter 28 may be a diesel particulate filter ("DPF"). The downstream reactor portion 24 is in line and in fluid communication with an outlet pipe 30.

Figure 3:
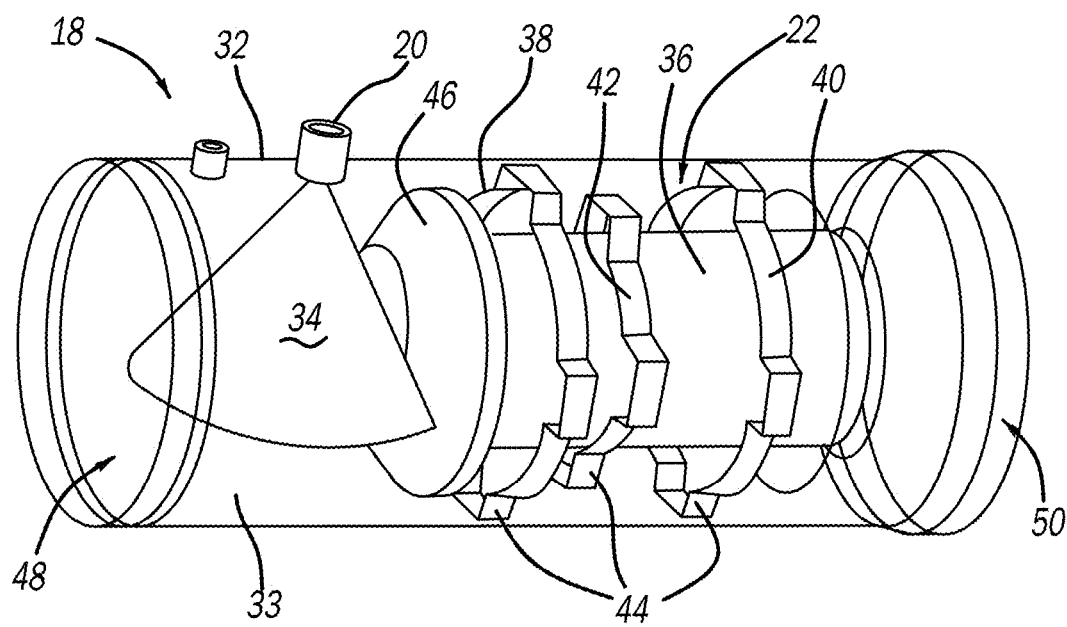
FIG. 3 is a transparent perspective view of a reactor portion with a mixer therein.

FIG. 3 illustrates an intermediate reactor portion 18. The intermediate reactor portion 18 includes an injector 20. The injector 20 is positioned on the wall 32 of the intermediate reactor portion 18. The injector 20 injects a spray of a reactant 34 into the interior 33 of the intermediate reactor portion 18. The injector 20 is located upstream of a mixer 22. The mixer 22 includes an inner tube 36. The inner tube 36 is located within an outer tube 38. The outer tube 38 is held within the intermediate reactor portion 18 via an outer ring bracket 40. The inner tube 36 is held within the outer tube 38 via an inner ring bracket 42. The outer ring bracket 40 and inner ring bracket 42 include spacers 44 integrated into the respective brackets. The mixer 22 further includes a diffuser 46. The diffuser 46 is located between the injector 20 and the inner and outer tubes 36, 38. The intermediate reactor portion 18 includes an inlet 48 opposing an outlet 50.

Figure 4:
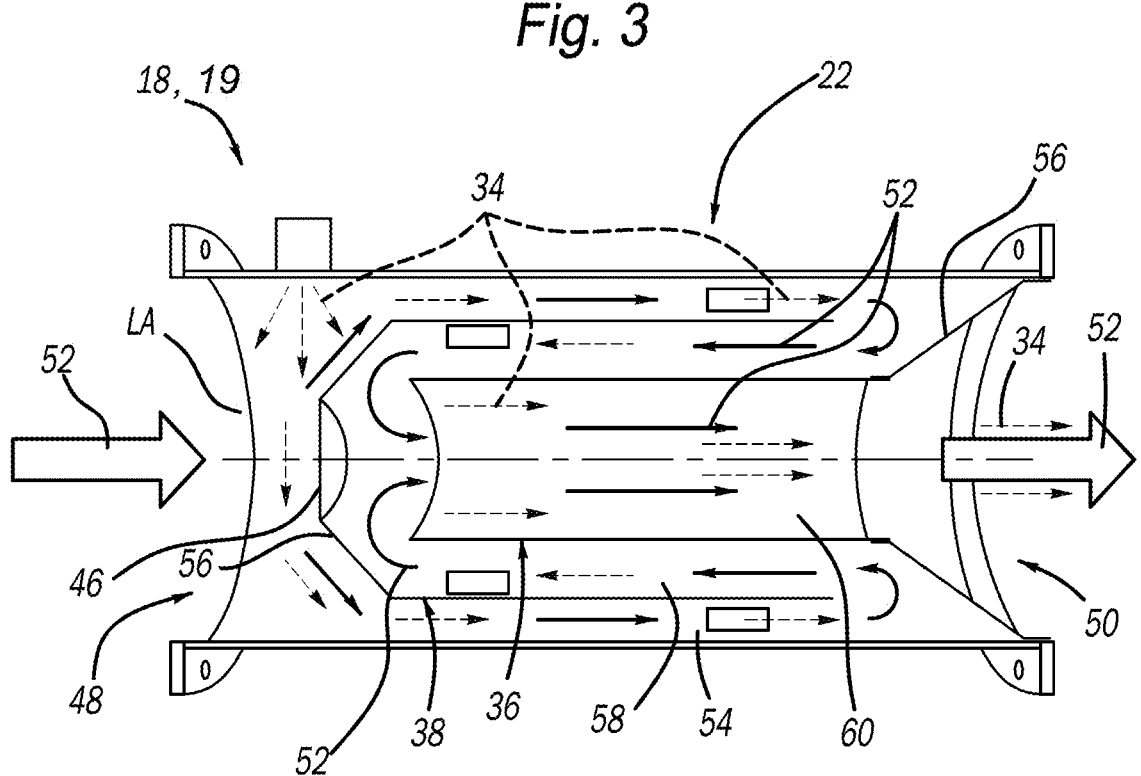
FIG. 4 is a cross-section of a reactor portion with a mixer therein and which illustrates a path of an exhaust stream flowing through the reactor portion of an exhaust aftertreatment apparatus.

FIG. 4 illustrates an intermediate reactor portion 18 receiving an exhaust stream 52 via an inlet 48. The intermediate reactor portion 18 may be referred to as a thermal enhancer 19. The exhaust stream 52 enters the intermediate reactor portion 18 through the inlet 48. Downstream from the inlet 48, a reactant 34 is introduced into the intermediate reactor portion 18. The reactant 34 is introduced by an injector 20. Both the exhaust stream 52 and the reactant 34 are guided away from the longitudinal axis LA of the intermediate reactor portion 18 via a diffuser 46. The exhaust stream 52 and reactant 34 enter an outer passage 54. The outer passage 54 is formed between the inner surface of the intermediate reactor portion 18 and the outer surface of the outer tube 38. The exhaust stream 52 and reactant 34 begin to mix with one another in the outer passage 54. The exhaust stream 52 and reactant 34 are then diverted in a reverse flow (e.g., toward the inlet 48) by a flow diverter 56. The exhaust stream 52 and reactant 34 enter an intermediate passage 58 and continue to mix with one another. The intermediate passage 58 is formed by the inner wall of the outer tube 38 and the outer wall of the inner tube 36. At the end of the intermediate passage 58, there is another flow diverter 56. The flow diverter 56 diverts and guides the exhaust stream 52 and reactant 34 toward an inner passage 60. The inner passage 60 is formed as the hollow interior of the inner tube 36. The reactant 34 and exhaust stream 52 continue to mix with one another as they flow through the inner passage 60 and exit the intermediate reactor portion 18 at the outlet 50.

Figure 5:
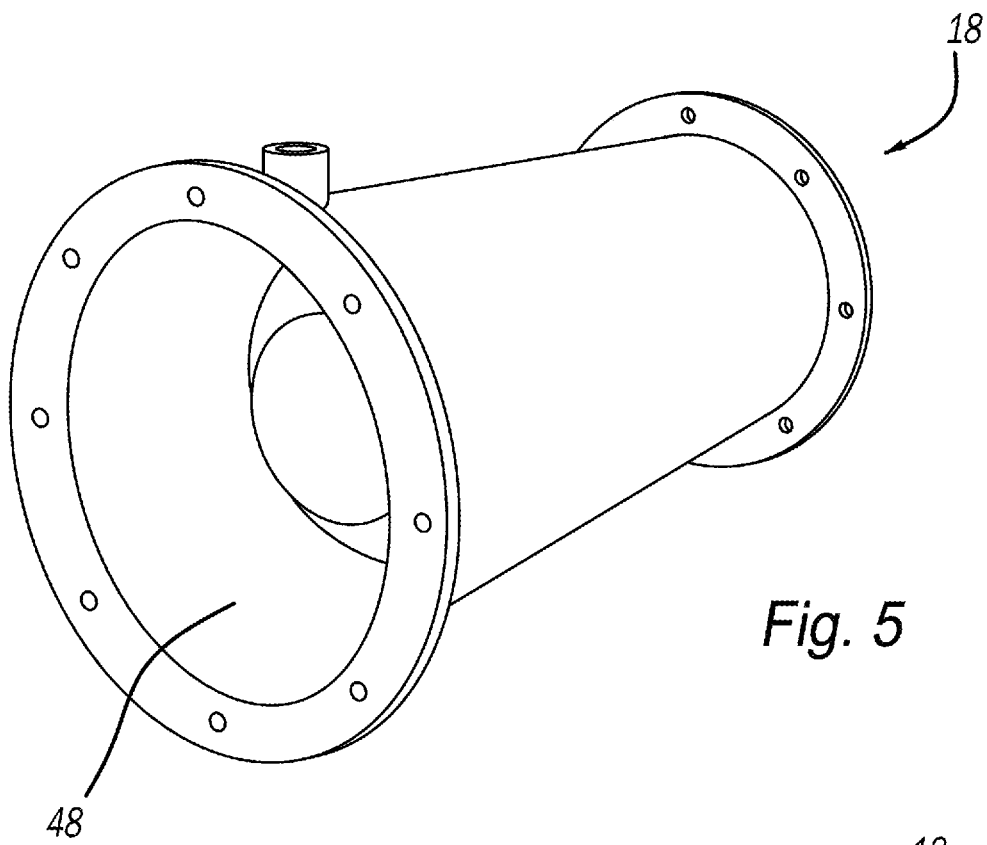
FIG. 5 illustrates an inlet of a reactor portion with a mixer therein.

FIG. 5 illustrates an inlet 48 of an intermediate reactor portion 18.

Figure 6:
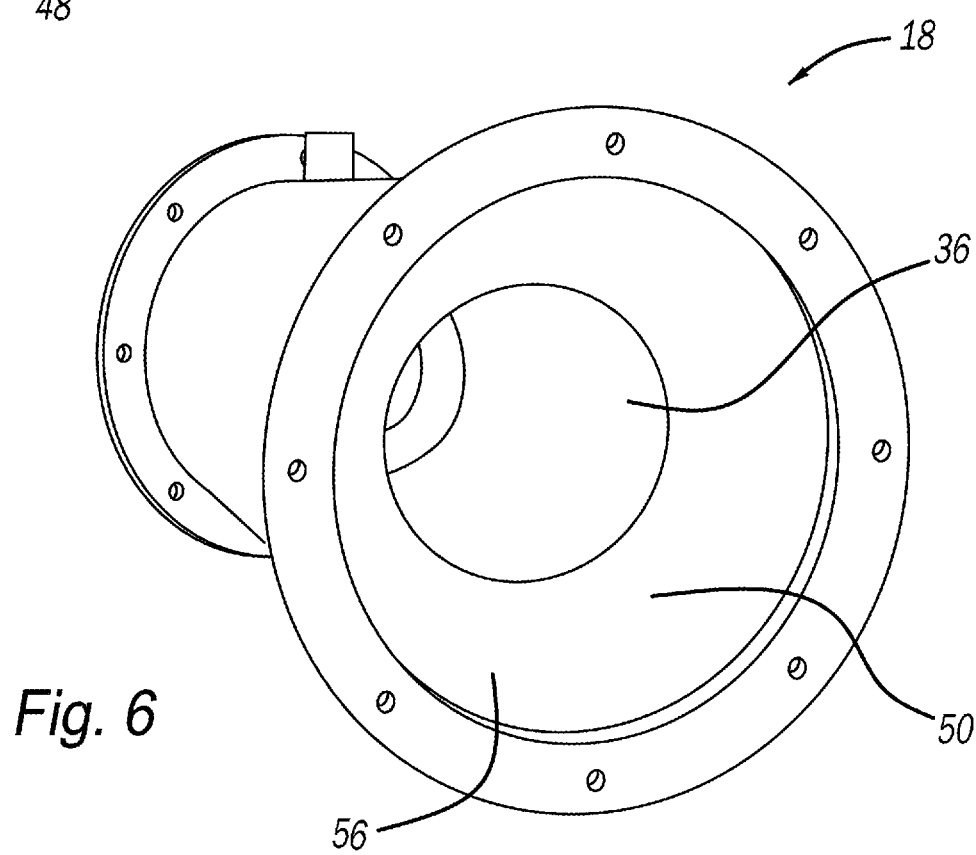
FIG. 6 illustrates an outlet of a reactor portion with a mixer therein.

FIG. 6 illustrates an outlet 50 of an intermediate reactor portion 18. As can be seen, a flow diverter 56 is formed from the flange at the outlet 50 going inward to the inner tube 36.

REFERENCE NUMBERS

10—Apparatus; 11—Exhaust aftertreatment apparatus; 12—Inlet pipe; 14—Upstream reactor portion; 16—Selective catalytic reductant (SCR); 18—Intermediate reactor portion; 19—Thermal enhancer; 20—Injector; 22—Mixer; 24—Downstream reactor portion; 26—Diesel oxidation catalyst; 28—Particulate filter; 30—Outlet pipe; 32—Wall; 33—Interior; 34—Reactant; 36—Inner tube; 38—Outer tube; 40—Outer ring bracket; 42—Inner ring bracket; 44—Spacer; 46—Diffuser; 48—Inlet; 50—Outlet; 52—Exhaust stream; 54—Outer passage; 56—Flow diverter; 58—Intermediate passage; 60—Inner passage; LA—Longitudinal axis; FA—Flow axis Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

What is claimed is:

1. An exhaust aftertreatment apparatus comprising:
   a) a reactor portion which is tubular with an inlet opposing an outlet, and has a flow axis parallel with a longitudinal axis of the reactor portion;
   b) a mixer located within the reactor portion, the mixer including:
      i) an outer tube having a diffuser affixed or integral thereto, wherein the diffuser is located opposite the outlet of the reactor portion;
      ii) an inner tube located within the outer tube and having an intermediate flow diverter affixed or integral thereto;
      iii) an outer passage formed between a wall of the reactor portion and the outer tube;
      iv) an intermediate passage formed between the outer tube and the inner tube;
      v) an inner passage formed within the inner tube;
      vi) one or more brackets which retain the outer tube within the reactor portion and about the inner tube, and wherein the one or more brackets include one or more ring brackets; and
   c) an injector in fluid communication with the reactor portion and upstream from the mixer, wherein the injector is configured to spray a reactant into the reactor portion such that it mixes with an exhaust stream in the mixer;
   wherein the diffuser expands toward the outer passage so as to direct the exhaust stream and the reactant toward the outer passage such that the exhaust stream and the reactant flow away from the inlet and toward the outlet while flowing through the outer passage;
   wherein the intermediate flow diverter extends from the wall of the reactor portion at the outlet toward the inner tube and is configured to direct the exhaust stream and the reactant from the outer passage toward the intermediate passage such that the exhaust stream and the reactant flow away from the outlet and toward the inlet while flowing through the intermediate passage;
   wherein the outer tube is separate and distanced from the intermediate flow diverter to provide for fluid communication between the outer passage and the intermediate passage;
   wherein an inner flow diverter is formed as a surface of the diffuser which faces toward the outlet of the reactor portion and is configured to direct the exhaust stream and the reactant from the intermediate passage to the inner passage, and
   wherein the one or more ring brackets include one or more outer brackets which has have a hollow interior in which the outer tube resides.

2. The exhaust aftertreatment apparatus of claim 1, wherein the mixer has a longitudinal axis parallel with the reactor portion; and
   wherein the longitudinal axis of the mixer is concentric with the longitudinal axis of the reactor portion.

3. The exhaust aftertreatment apparatus of claim 1, wherein the inner tube is integrally attached to the reactor portion via the intermediate flow diverter.

4. The exhaust aftertreatment apparatus of claim 3, wherein the intermediate flow diverter extends from a flange of the reactor portion at the outlet toward the inner tube.

5. The exhaust aftertreatment apparatus of claim 1, wherein the one or more brackets include one or more inner brackets.

6. The exhaust aftertreatment apparatus of claim 5, wherein the one or more inner brackets are located about an exterior of the inner tube and within an interior of the outer tube.

7. The exhaust aftertreatment apparatus of claim 5, wherein the one or more outer brackets are located about an exterior of the outer tube and an interior of the reactor portion.

8. The exhaust aftertreatment apparatus of claim 1, wherein the one or more brackets include one or more spacers affixed or integrated thereto.

9. The exhaust aftertreatment apparatus of claim 8, wherein the one or more spacers are configured to distance the outer tube from the inner tube such as to form the intermediate passage, distance the outer tube from the reactor portion to form the outer passage, or both.

10. The exhaust aftertreatment apparatus of claim 1, wherein the reactant is configured to maintain or increase a temperature of the exhaust stream while the exhaust stream flows through the reactor portion.

11. The exhaust aftertreatment apparatus of claim 10, wherein the reactor portion is a thermal enhancer of the exhaust aftertreatment apparatus.

12. The exhaust aftertreatment apparatus of claim 1, wherein the reactor portion is located prior to a filter regeneration portion of the exhaust aftertreatment apparatus.

13. The exhaust aftertreatment apparatus of claim 12, wherein the filter regeneration portion includes a catalyst and a particulate filter.

14. The exhaust aftertreatment apparatus of claim 1, wherein the reactor portion is an intermediate reactor portion.

15. The exhaust aftertreatment apparatus of claim 14, wherein the intermediate reactor portion is downstream from an upstream reactor portion, upstream of a downstream reactor portion, or both.

16. The exhaust aftertreatment apparatus of claim 15, wherein the upstream reactor portion is configured to perform selective catalytic reduction.

17. The exhaust aftertreatment apparatus of claim 15, wherein the downstream reactor portion is configured to perform filter regeneration of a particulate filter located therein.

18. The exhaust aftertreatment apparatus of claim 15, wherein the intermediate reactor portion is a thermal enhancer configured to maintain or increase a temperature of the exhaust stream passing therethrough prior to transmitting the exhaust stream to the downstream reactor portion.

19. The exhaust aftertreatment apparatus of claim 1, wherein the injector is a hydrocarbon doser.

20. A method using the exhaust aftertreatment apparatus according to claim 1 for treating the exhaust stream resulting from internal combustion of a transportation vehicle, the method comprising:
- a) flowing the exhaust stream through the inlet of the reactor portion such that a direction of an untreated exhaust stream is substantially parallel to the longitudinal axis of the reactor portion;
- b) introducing the reactant into the exhaust stream within the reactor portion after the inlet;
- c) diffusing and directing the exhaust stream and the reactant away from the longitudinal axis and toward the outlet of the reactor portion;
- d) flowing the exhaust stream and the reactant toward the outlet;
- e) reversing a flow direction of the exhaust stream and the reactant such that the exhaust stream and the reactant flow toward the inlet;
- f) reversing the flow direction of the exhaust stream and the reactant such that the exhaust stream and the reactant flow toward and through the outlet of the reactor portion; and
- wherein the reactant mixes with the exhaust stream such that the exhaust stream maintains or has an increased temperature at the outlet as compared to the inlet.

21. An exhaust aftertreatment apparatus comprising:
- a) a reactor portion which is tubular with an inlet opposing an outlet, and has a flow axis parallel with a longitudinal axis of the reactor portion;
- b) a mixer located within the reactor portion, the mixer including:
  - i) an outer tube having a diffuser affixed or integral thereto, wherein the diffuser is located opposite the outlet of the reactor portion;
  - ii) an inner tube located within the outer tube and having an intermediate flow diverter affixed or integral thereto;
  - iii) an outer passage formed between a wall of the reactor portion and the outer tube;
  - iv) an intermediate passage formed between the outer tube and the inner tube;
  - v) an inner passage formed within the inner tube;
  - vi) one or more brackets which retain the outer tube within the reactor portion and about the inner tube, and wherein the one or more brackets include one or more ring brackets; and
- c) an injector in fluid communication with the reactor portion and upstream from the mixer, wherein the injector is configured to spray a reactant into the reactor portion such that it mixes with an exhaust stream in the mixer;
- wherein the diffuser expands toward the outer passage so as to direct the exhaust stream and the reactant toward the outer passage such that the exhaust stream and the reactant flow away from the inlet and toward the outlet while flowing through the outer passage;
- wherein the intermediate flow diverter extends from the wall of the reactor portion at the outlet toward the inner tube and is configured to direct the exhaust stream and the reactant from the outer passage toward the intermediate passage such that the exhaust stream and the reactant flow away from the outlet and toward the inlet while flowing through the intermediate passage;
- wherein the outer tube is separate and distanced from the intermediate flow diverter to provide for fluid communication between the outer passage and the intermediate passage;
- wherein an inner flow diverter is formed as a surface of the diffuser which faces toward the outlet of the reactor portion and is configured to direct the exhaust stream and the reactant from the intermediate passage to the inner passage;
- wherein the one or more brackets include one or more inner brackets and the one or more inner brackets are located about an exterior of the inner tube and within an interior of the outer tube; and wherein the one or more ring brackets include one or more outer brackets which have a hollow interior in which the outer tube resides.

* * * * *